United States Patent [19]

Shoemaker

[11] 4,033,666

[45] July 5, 1977

[54] MICROSCOPE VERTICAL ILLUMINATOR

[75] Inventor: Arthur H. Shoemaker, East Aurora, N.Y.

[73] Assignee: American Optical Corporation, Southbridge, Mass.

[22] Filed: June 28, 1976

[21] Appl. No.: 700,268

Related U.S. Application Data

[62] Division of Ser. No. 607,842, Aug. 25, 1975.

[52] U.S. Cl. .................................. 350/91; 350/87
[51] Int. Cl.² ...................................... G02B 21/06
[58] Field of Search ............. 350/91, 87, 236, 237, 350/54

[56] References Cited

UNITED STATES PATENTS 3,297,391 1/1967 Benford et al. ...................... 350/91

Primary Examiner—David H. Rubin
Attorney, Agent, or Firm—Alan H. Spencer; William C. Nealon; H. R. Berkenstock, Jr.

[57] ABSTRACT

A microscope illumination system provides light for both transmitted and vertical microscopy techniques. A transmitted light illuminator comprises a collector lens system, a zoom lens system, and a collimator lens system which direct the light from a source to the microscope condenser. The vertical illumination system utilizes the same light source and comprises a collimator lens system, a relay lens system, and a collector lens system which provides the light directed into the rear of the microscope objective by a beam splitter.

2 Claims, 4 Drawing Figures

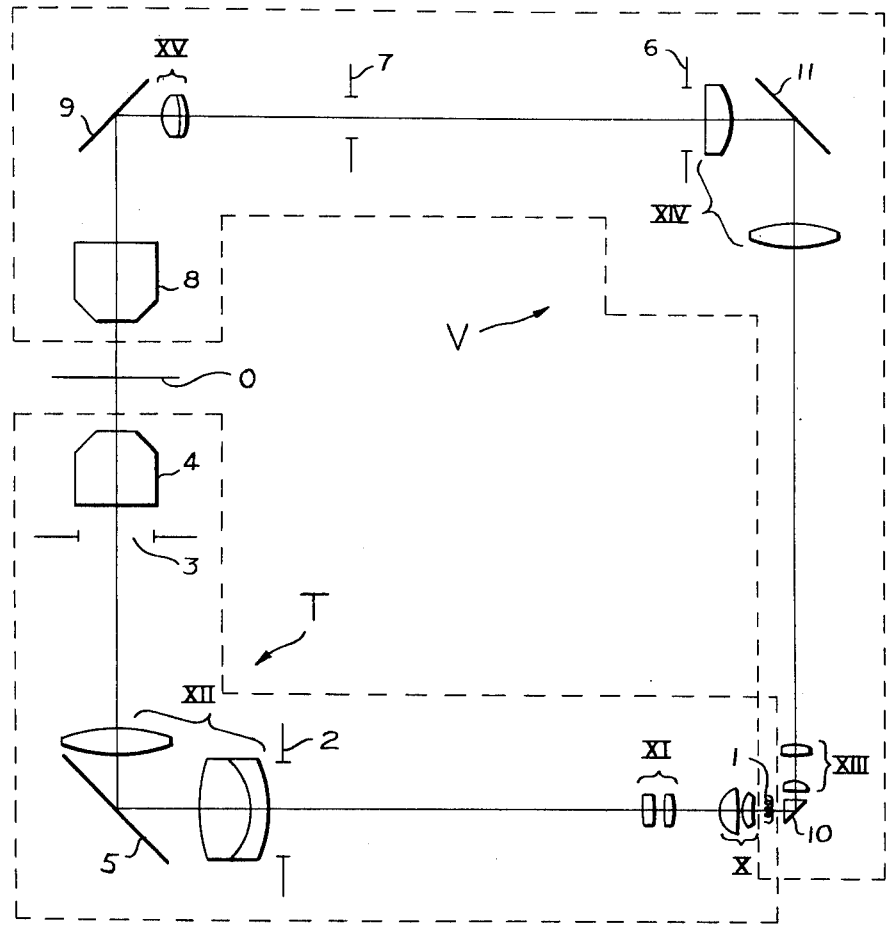
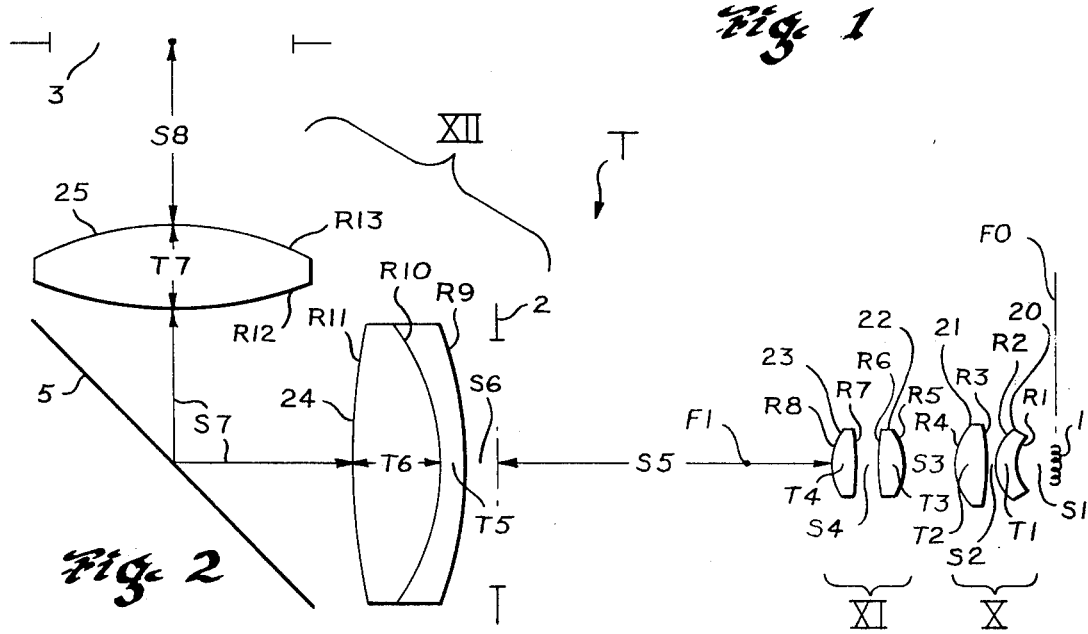
Fig. 1
Fig. 2

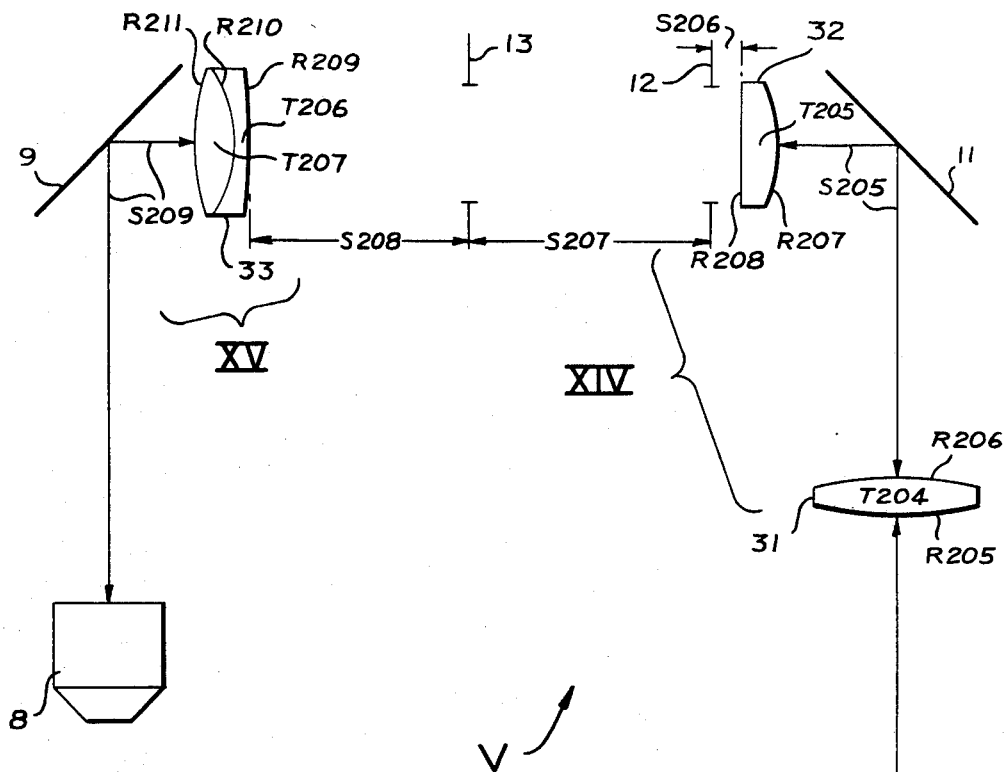
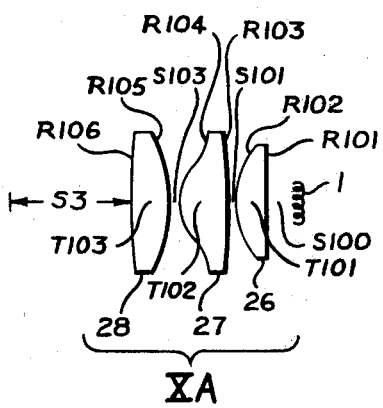
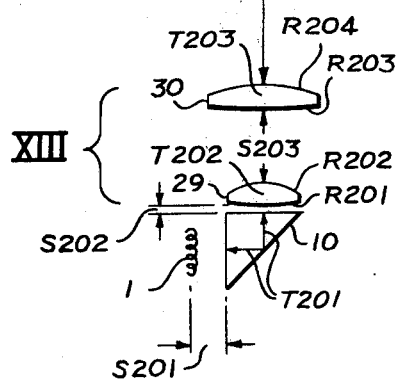
Fig. 3    Fig. 4

MICROSCOPE VERTICAL ILLUMINATOR

This is a division of application Ser. No. 607,842 filed Aug. 25, 1975.

BACKGROUND OF THE INVENTION

This invention relates to a microscope illumination system, and more particularly, to an illumination system capable of providing light for transmitted as well as vertical microscopy techniques utilizing the Kohler method of illumination.

It is an object of the present invention to provide Kohler illumination for standard 4X through 100X objectives.

It is a further object of the present invention to provide transmitted light illumination using objectives of 4X to 100X without using special lenses.

It is a still further object of the present invention to provide an illumination system for vertical or transmitted light having lateral color-free imaging of the field iris.

It is another object of the present invention to provide Kohler illumination in the vertical light mode for standard 10X through 100X objectives.

It is still another object of the present invention to provide Kohler illumination in either the vertical or transmitted light modes of a microscope having up to a 24mm field.

Prior art illumination systems frequently required the use of additional lenses commonly referred to as "throw-in" lenses in order to accommodate transmitted light objectives from 4X to 100X. Also, prior art illumination systems for microscopes intended to be used with either vertical or transmitted light illumination, usually required separate sources of illumination.

BRIEF DESCRIPTION OF THE INVENTION AND DRAWINGS

The present invention avoids the use of throw-in lenses in transmitted light Kohler illumination systems by using a special zoom unit which permits filling both the field iris as well as the back aperture diaphragm of the condenser simultaneously throughout the required range of adjustment for objectives ranging from 4X to 100X. The zoom unit offers one advantage in providing most efficient use of the illumination source for each objective rather than comprising on each of a plurality of objectives. Also, it is possible to use the illumination system of the present invention in both the transmitted light and vertical light modes simultaneously since each mode uses a different side of the filament.

FIG. 1 is an optical diagram of both the transmitted and vertical illumination systems viewed transverse to the optical axis thereof;

FIG. 2 is an optical diagram of the transmitted light portion of the illumination system in detail;

FIG. 3 is an optical diagram of an alternate collector lens system; and

FIG. 4 is an optical diagram of the vertical light portion of the illumination system.

DESCRIPTION OF THE PREFERRED EMBODIMENT

Referring to FIG. 1, a transmitted light system T collects light from filament 1 in a collector lens system X, which is then directed along an optical axis to zoom system XI. The light continues along the optical axis through field iris 2, through collimating system XII to the back aperture 3 of condenser 4 to object 0. An aperture diaphram is usually positioned in the condenser back aperture 3 to permit the microscopist to adjust the intensity of illumination. Field iris 2 is used by the microscopist to adjust the area illuminated to suit a chosen objective. It is usually desirable to use a deflector 5 in oder to reduce the size of a microscope base which would otherwise be required.

The vertical illumination portion V has a collector lens system XIII which collects light from the back of filament 1 and directs the same along an optical axis to relay lens system XIV, through aperture diaphram 6 and field iris 7 to collimator XV, which provides the light for the microscope objective 8 utilizing beam splitter 9. It is usually desirable to utilize a prism 10 and beam deflector 11 in order to utilize filament 1 instead of requiring an additional light source.

Referring to FIG. 2, collector X comprises a concavo-convex positive singlet 20, and a double convex positive singlet 21. The rearmost surface of singlet 21 is aspheric. Zoom system XI has a convex-plano positive singlet 22, and a plano-convex positive singlet 23. The collimator lens system XII comprises a double convex positive doublet 24, and a double convex positive singlet 25. With respect to lens parameters of the transmitted light illumination system, the axial thicknesses of successive lens elements are designated T1 to T7, and the axial spaces from the filament plane FO are designated S1 to S8. The successive lens radii are designated R1 to R13, wherein the minus sign (−) applies to surfaces whose center of curvature lies on the filament side of their vertices. The refraction indices and Abbe numbers of the glasses are designated ND(1) to ND(7) and $\nu(1)$ to $\nu(7)$, respectively.

Since the numerical aperture in size of the light in the object 0 is directly proportional to the focal length F, in millimeters, of condenser 4, the lens parameters in the following Table I are a function of F, which can typically vary from 9mm to 12mm.

TABLE I

| Lens | Radius (R) | Thickness (T) | Spacing (S) | Index of Refraction (ND) | Abbe No. ($\nu$) |
|---|---|---|---|---|---|
| | | | $S_1=$ 0.64633F | | |
| 20 | $R_1=-3.38335F$ | $T_1=0.48536F$ | | $ND_1=1.523$ | $\nu_1=58.60$ |
| | $R_2=0.82730F$ | | | | |
| | | | $S_2=$ 0.02585F | | |
| 21 | $R_3=2.23395F$ | $T_2=0.62048F$ | | $ND_2=1.523$ | $\nu_2=58.60$ |
| | $R_4=-0.99343F$ | | | | |
| | | | $S_3=$ 1.5253F(4X) 3.0765F(10X) 5.5584F(100X) | | |
| 22 | $R_5=1.3940F$ | $T_3=0.41365F$ | | $ND_3=1.523$ | $\nu_3=58.60$ |
| | $R_6=\infty$ | | | | |

TABLE I-continued

| Lens | Radius (R) | Thickness (T) | Spacing (S) | Index of Refraction (ND) | Abbe No. ($\nu$) |
|---|---|---|---|---|---|
| | | | $S_4=$ 0.72389F | | |
| 23 | $R_7=\infty$ | $T_4=0.41365F$ | | $ND_4=1.523$ | $\nu_4=58.60$ |
| | $R_8=-1.6546F$ | | | | |
| | | | $S_5=$ 5.8169F(4X) | | |
| | | | 4.2658F(10X) | | |
| | | | 1.7839F(100X) | | |
| | | | $S_6=$ 1.03413F | | |
| | $R_9=10.8635F$ | $T_5=0.77559F$ | | $ND_5=1.786$ | $\nu_5=25.52$ |
| 24 | $R_{10}=3.9555F$ | | | | |
| | | $T_6=2.06825F$ | | $ND_6=1.588$ | $\nu_6=61.19$ |
| | $R_{11}=-5.01551F$ | | | | |
| | | | $S_7=$ 5.37746F | | |
| | $R_{12}=5.14478F$ | $T_7=1.24095F$ | | $ND_7=1.498$ $\nu_7=66.94$ | |
| 25 | $R_{13}=-24.8263F$ | | | | |
| | | | $S_8=$ 6.72182 | | |

Wherein F is in millimeters.

The back surface of singlet 21 with radius $R_4$, is an axially symmetrical aspheric surface with Z axis of revolution. The value of Z for any given value of $x$ and $y$ and is defined by the equation:

$$Z = cp^2/[1 + \sqrt{1-(k+1)c^2p^2}] + dp^4 + ep^6 + fp^8 + gp^{10}$$

wherein:

$d = 0.181924 \times 10^{-3}$
$e = -0.361616 \times 10^{-5}$
$f = 0.943675 \times 10^{-7}$
$g = -0.743223 \times 10^{-9}$
$p^2 = ]x^2 + y^2$
$c = 1/R_4$ and
$k = -1.0$ The mathematical support for this formula and explanation may be found in the Military Standard Handbook, MIL-HBDK-141 (5OCT62), Sec. 5.5.1, Page 5-13 to 5-21.

Numerically stated, the preferred embodiment of the invention when the condenser has a focal length of 9.67mm, has the following relationship.

TABLE II

| Lens | Radius (R) | Thickness (T) | Spacing (S) |
|---|---|---|---|
| | | | $S_1=$ 6.25 |
| 20 | $R_1=32.717$ | $T_1=4.500$ | |
| | $R_2=-8.000$ | | |
| | | | $S_2=$ 0.25 |
| | $R_3=21.603$ | | |
| 21 | | $T_2=6.000$ | |
| | $R_4=-9.6065*$ | | |
| | | | $S_3=$ 14.75 (4X) |
| | | | 29.75 (10X) |
| | | | 53.75 (100X) |
| | $R_5=13.480$ | | |
| 22 | | $T_3=4.000$ | |
| | $R_6=\infty$ | | |
| | | | $S_4=$ 7.000 |
| | $R_7=\infty$ | | |
| 23 | | $T_4=4.000$ | |

TABLE II-continued

| Lens | Radius (R) | Thickness (T) | Spacing (S) |
|---|---|---|---|
| | $R_8=-16.000$ | | |
| | | | $S_5=$ 56.25 (4X) |
| | | | 41.25 (10X) |
| | | | 17.25 (100X) |
| | | | $S_6=$ 10.000 |
| | $R_9=105.050$ | $T_5=7.500$ | |
| 24 | $R_{10}=38.250$ | | |
| | | $T_6=20.000$ | |
| | $R_{11}=-48.500$ | | |
| | | | $S_7=$ 52.000 |
| | $R_{12}=49.750$ | | |
| 25 | | $T_7=12.000$ | |
| | $R_{13}=-240.070$ | | |
| | | | $S_8=$ 65.000 |

*A conic coefficient and four aspheric deformation coefficients above.

Referring to FIG. 3, alternate collector XA has a plano-convex positive singlet 26 as the first element. As the second element, the collector has a plano-convex positive singlet 27, and the last element is a double convex positive singlet 28. The rearmost surface of 27 and foremost surface of 28 are aspheric surfaces.

The magnification of collector groups X and XA is substantially the same (3X); however, collector group XA has a higher numerical aperture providing a larger filament image at back aperture plane 3 for a given field size at object plane O. With respect to lens parameters of the transmitted light illumination system, the axial thicknesses of successive lens elements are designated T101 to T103, and the axial spaces from the filament plane FO are designated S100 to S103. The successive lens radii are designated R101 to R106, wherein the minus sign (−) applies to surfaces whose center of curvature lies on the filament side of their vertices. The refraction indices and Abbe numbers of the glasses are designated ND(101) to ND(103) and $\nu(101)$ to $\nu(103)$, respectively.

TABLE III

| Lens | Radius (R) | Thickness (T) | Spacing (S) | Index of Refraction (ND) | Abbe No. ($\nu$) |
|---|---|---|---|---|---|
| | | | $S_{100}=$ 0.5171F | | |
| 26 | $R_{101}=\infty$ | $T_{101}=0.5171F$ | | $ND_{101}=1.523$ | $\nu_{101}=58.60$ |
| | $R_{102}=-0.9486F$ | | | | |
| | | | $S_{101}=$ 0.0103F | | |
| 27 | $R_{103}=\infty$ | $T_{102}=0.5688F$ | | $ND_{102}=1.523$ | $\nu_{102}=58.60$ |
| | $R_{104}=-1.15669F*$ | | | | |
| | | | $S_{102}=$ 0.0103F | | |
| | $R_{105}=1.61446F**$ | | | | |
| 28 | | $T_{103}=0.5688F$ | | $ND_{103}=1.523$ | $\nu_{103}=58.60$ |

TABLE III-continued

| Lens | Radius (R) | Thickness (T) | Spacing (S) | Index of Refraction (ND) | Abbe No. ($\nu$) |
|---|---|---|---|---|---|
| | $R_{106}=-12.7564F$ | | | | |
| | | | $S_{103}=$ 1.0910F(4X) | | |
| | | | 2.6422F(10X) | | |
| | | | 5.1241F(100X) | | |

*Associated with $R_{104}$ is a conic coefficient k=−0.99341 and four aspheric deformation coefficients:
 d = −0.50246 × 10⁻⁴
 e = −0.43451 × 10⁻⁵
 f = 0.11169 × 10⁻⁶
 g = −0.57450 × 10⁻⁹
**Associated with $R_{105}$ is a conic coefficient k =−0.9817 and four aspheric deformation coefficients:
 d = −0.59858 × 10⁻⁴
 e = −0.44852 × 10⁻⁵
 f = 0.10981 × 10⁻⁶
 g = −0.60834 × 10⁻⁹

A preferred embodiment of the alternate collector system using a condenser focal length of 9.67mm has the following specific values.

TABLE IV

| Lens | Radius (R) | Thickness (T) | Spacing (S) |
|---|---|---|---|
| | | | $S_{100}=$ 5.00 |
| | $R_{101}=\infty$ | | |
| 26 | | $T_{101}=5.00$ | |
| | $R_{102}=-9.173$ | | |
| | | | $S_{101}=$ 0.100 |
| | $R_{103}=\infty$ | | |
| 27 | | $T_{102}=5.50$ | |
| | $R_{104}=-11.185*$ | | |
| | | | $S_{102}=$ 0.100 |
| | $R_{105}=15.612**$ | | |
| 28 | | $T_{103}=5.50$ | |
| | $R_{10}=-123.354$ | | |
| | | | $S_{103}=$ 10.550 (4X) |
| | | | 25.550 (10X) |
| | | | 49.550 (100X) |

*Coefficients appear above in Table III.
**Coefficients appear above in Table III.

The vertical illumination portion of the illumination system is more clearly shown in FIG. 4. Light from the backside of filament 1 is preferably deflected by prism 10 to collector XIII, which directs the light through relay system XIV to collimator XV, thence to beam splitter 9 and objective 8. Collector lens system XIII has, as the first element, a plano-convex positive singlet 29, and a plano-convex positive singlet 30. The relay lens system contains a double convex positive singlet 31, and a convex-plano positive singlet 32, which provides a magnified image of filament 1 to aperture diaphram 12.

After imaging the filament at aperture diaphram 12, the light passes through field iris 13 to collimator 33. Collimating lens 33 is a double convex positive doublet which re-images the filament near the back image plane (shoulder of objective 8) and an image of field iris 13 substantially at infinity. Prism 10 and deflector 11 in conjunction with beam splitter 9, are used to fold the optical system to minimize space and provide a convenient optical path for association with a micro cope.

With respect to lens parameters of the transmitted light illumination system, the axial thicknesses of successive lens elements are designated T201 to T207, and the axial spaces from the filament plane FO are designated S201 to S209. The successive lens radii are designated R201 to R211, wherein the minus sign(−) applies to surfaces whose center of curvature lies on the filament side of their vertices. The refraction indices and Abbe numbers of the glasses are designated ND(201) to ND(207) and $\nu$(201) and $\nu$(207), respectively.

TABLE V

| Lens | Radius (R) | Thickness (T) | Spacing (S) | Index of Refraction ($N_D$) | Abbe No. ($\nu$) |
|---|---|---|---|---|---|
| | | | $S_{201}=0.5688Q$ | | |
| | | $T_{201}=1.2410Q$ | | $ND_{201}=1.69963$ | $\nu_{201}=34.67$ |
| | | | $S_{202}=0.0000Q$ | | |
| | $R_{201}=\infty$ | | | | |
| 29 | | $T_{202}=0.2585Q$ | | $ND_{202}=1.58904$ | $\nu_{202}=61.23$ |
| | $R_{202}=-1.3005Q$ | | | | |
| | | | $S_{203}=1.2410Q$ | | |
| | $R_{203}=\infty$ | | | | |
| 30 | | $T_{203}=0.2585Q$ | | $ND_{203}=1.58904$ | $\nu_{203}=61.23$ |
| | $R_{204}=-3.3739Q$ | | | | |
| | | | $S_{204}=14.5605Q$ | | |
| | $R_{205}=11.2289Q$ | | | | |
| 31 | | $T_{204}=0.5171Q$ | | $ND_{204}=1.52300$ | $\nu_{204}=58.60$ |
| | $R_{206}=-11.2289Q$ | | | | |
| | | | $S_{205}=9.7248Q$ | | |
| | $R_{207}=4.0384Q$ | | | | |
| 32 | | $T_{205}=0.3619Q$ | | $ND_{205}=1.52300$ | $\nu_{205}=58.60$ |
| | $R_{208}=\infty$ | | | | |
| | | | $S_{206}=0.5336Q$ | | |
| | | | $S_{207}=5.5843Q$ | | |
| | | | $S_{208}=4.7043Q$ | | |
| | $R_{209}=7.8283Q$ | | | | |
| | | $T_{206}=0.2585Q$ | | $ND_{206}=1.78600$ | $\nu_{206}=25.52$ |
| 33 | $R_{210}=4.0384Q$ | | | | |
| | | $T_{207}=0.5171Q$ | | $ND_{207}=1.58904$ | $\nu_{207}=61.23$ |
| | $R_{211}=-4.0384Q$ | | | | |
| | | | $S_{209}=9.2036Q$ | | |

Wherein Q is equal to 9mm to 15mm.

A preferred embodiment of the vertical illumination system wherein Q is equal to 9.67mm is given by the following values.

TABLE VI

| Lens | Radius (R) | Thickness (T) | Spacing (S) |
|---|---|---|---|
|  |  |  | $S_{201}$=5.50 |
|  |  | $T_{201}$=12.00 |  |
|  |  |  | $S_{202}$=0.00 |
| 29 | $R_{201}$=∞ |  |  |
|  |  | $T_{202}$=2.50 |  |
|  | $R_{202}$=−12.576 |  |  |
|  |  |  | $S_{203}$=12.00 |
|  | $R_{203}$=∞ |  |  |
| 30 |  | $T_{203}$=2.50 |  |
|  | $R_{204}$=−32.6255 |  |  |
|  |  |  | $S_{204}$=140.80 |
|  | $R_{205}$=108.583 |  |  |
| 31 |  | $T_{204}$=5.00 |  |
|  | $R_{206}$=108.583 |  |  |
|  |  |  | $S_{205}$=94.04 |
|  | $R_{207}$=39.051 |  |  |
| 32 |  | $T_{205}$=3.50 |  |
|  | $R_{208}$=∞ |  |  |
|  |  |  | $S_{206}$=5.16 |
|  |  |  | $S_{207}$=54.00 |
|  |  |  | $S_{208}$=45.50 |
|  | $R_{209}$=75.700 |  |  |
|  |  | $T_{206}$=2.50 |  |
| 33 | $R_{210}$=39.051 |  |  |
|  |  | $T_{207}$=5.00 |  |
|  | $R_{211}$=−39.051 |  |  |
|  |  |  | $S_{209}$=89.00 |

In the foregoing designs, particularly in the specific embodiments, a filament size of at least 2mm × 1mm is necessary to assure that the image of the filament extends entirely across the opening defined by the aperture diaphram 6 and/or 12.

What is claimed is:

1. An illumination system for vertical microscopy comprising, in alignment and sequence along an optical axis, a light source, a collector lens system, having two plano-convex positive singlets (29) and (30), a relay lens system having a double convex singlet (31), and a convex-plano singlet (32), an aperture diaphram, an iris diaphram, a double convex positive doublet (33) collimating lens and a beam splitter to direct light from said source into the rear of a microscope objective and permit light coming from said objective to pass through said beam splitter to an eyepiece, said system having the following parameters:

| Lens | Radius (R) | Thickness (T) | Spacing (S) | Index of Refraction (ND) | Abbe No. ($\nu$) |
|---|---|---|---|---|---|
|  |  |  | $S_{201}$=0.5688Q |  |  |
|  | Prism | $T_{201}$=1.2410Q |  | $ND_{201}$=1.69963 | $\nu_{201}$=34.67 |
|  |  |  | $S_{202}$=0.0000Q |  |  |
|  | $R_{201}$=∞ |  |  |  |  |
| 29 |  | $T_{202}$=0.2585Q |  | $ND_{202}$=1.58904 | $\nu_{202}$=61.23 |
|  | $R_{202}$=−1.3005Q |  |  |  |  |
|  |  |  | $S_{203}$=1.2410 Q |  |  |
|  | $R_{203}$=∞ |  |  |  |  |
| 30 |  | $T_{203}$=0.2585Q |  | $ND_{203}$=1.58904 | $\nu_{203}$=61.23 |
|  | $R_{204}$=−3.3739Q |  |  |  |  |
|  |  |  | $S_{204}$=14.5605Q |  |  |
|  | $R_{205}$=11.2289Q |  |  |  |  |
| 31 |  | $T_{204}$=0.5171Q |  | $ND_{204}$=1.52300 | $\nu_{204}$=58.60 |
|  | $R_{206}$=−11.2289Q |  |  |  |  |
|  |  |  | $S_{205}$=9.7248Q |  |  |
| 32 | $R_{207}$=4.0384Q | $T_{205}$=0.3619Q |  | $ND_{205}$=1.52300 | $\nu_{205}$=58.60 |
|  | $R_{208}$=∞ |  | $S_{206}$=0.5336Q |  |  |
|  | Diaphragm Spacings |  | $S_{207}$=5.5843Q |  |  |
|  |  |  | $S_{208}$=4.7053Q |  |  |
|  | $R_{209}$=7.8243Q |  |  |  |  |
| 33 | $R_{210}$=4.0384Q | $T_{206}$=0.2585Q |  | $ND_{206}$=1.78600 | $\nu_{206}$=25.52 |
|  | $R_{211}$=−4.0384Q | $T_{207}$=0.5171Q |  | $ND_{207}$=1.58904 | $\nu_{207}$=61.23 |
|  |  |  | $S_{209}$=9.2036Q |  |  | wherein Q is equal to 9mm to 15mm.

2. The illumination system according to claim 1 wherein Q is 9.67mm.

* * * * *